H. T. SHEARER.
GRINDING MACHINE.
APPLICATION FILED MAR. 13, 1913.
1,165,365.
Patented Dec. 21, 1915.
9 SHEETS—SHEET 1.
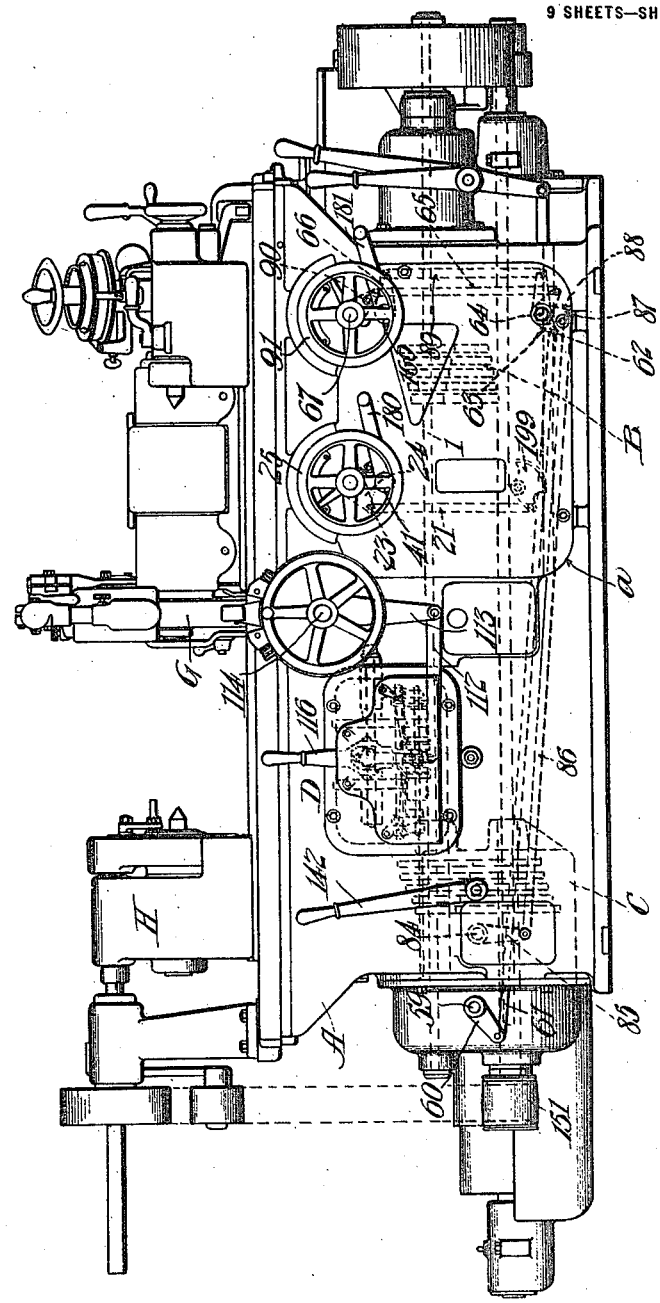
Witnesses
T. L. McLean
C. J. Clements
Inventor
Harry T. Shearer,
By Bradford & Doolittle,
Attorneys

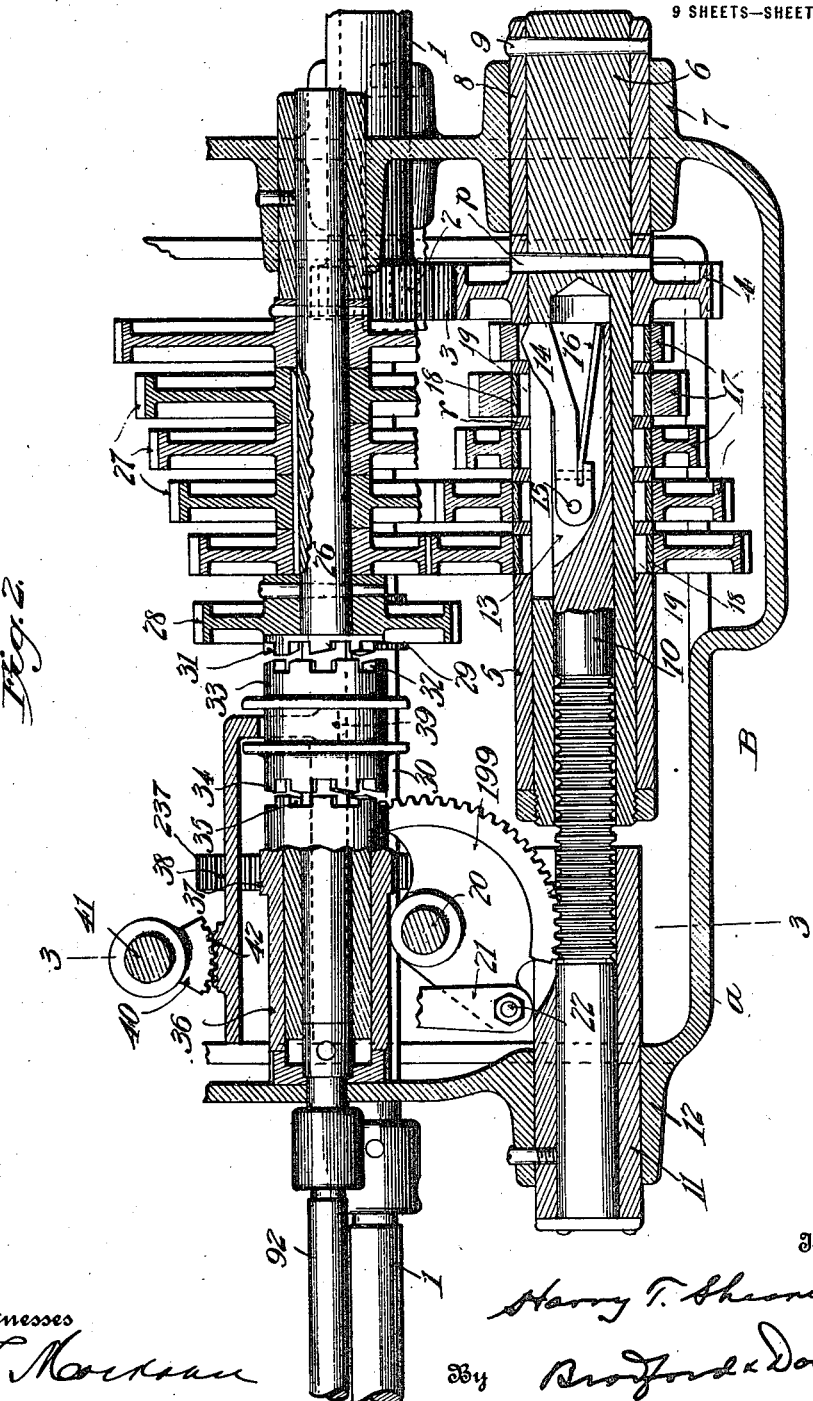

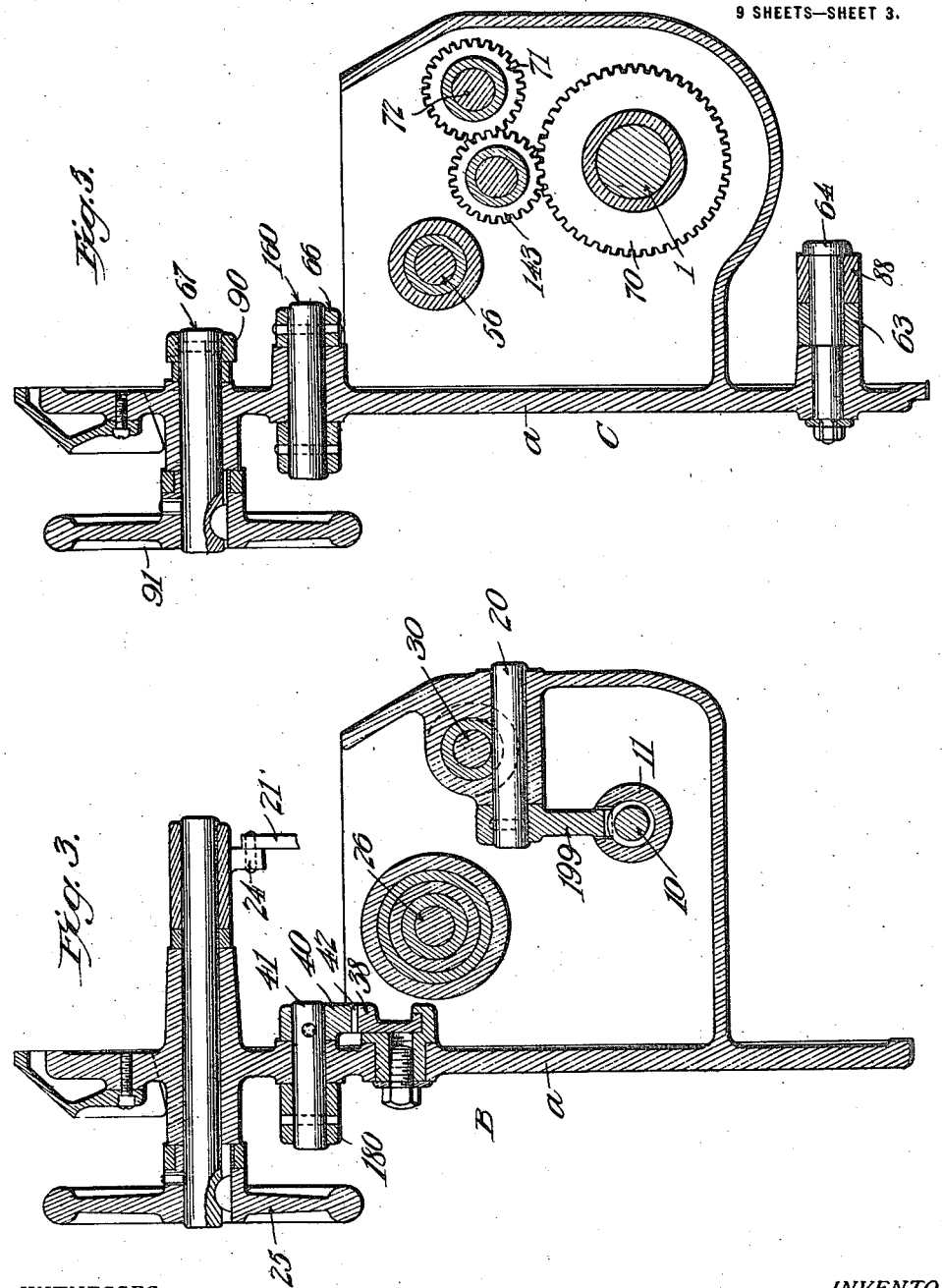

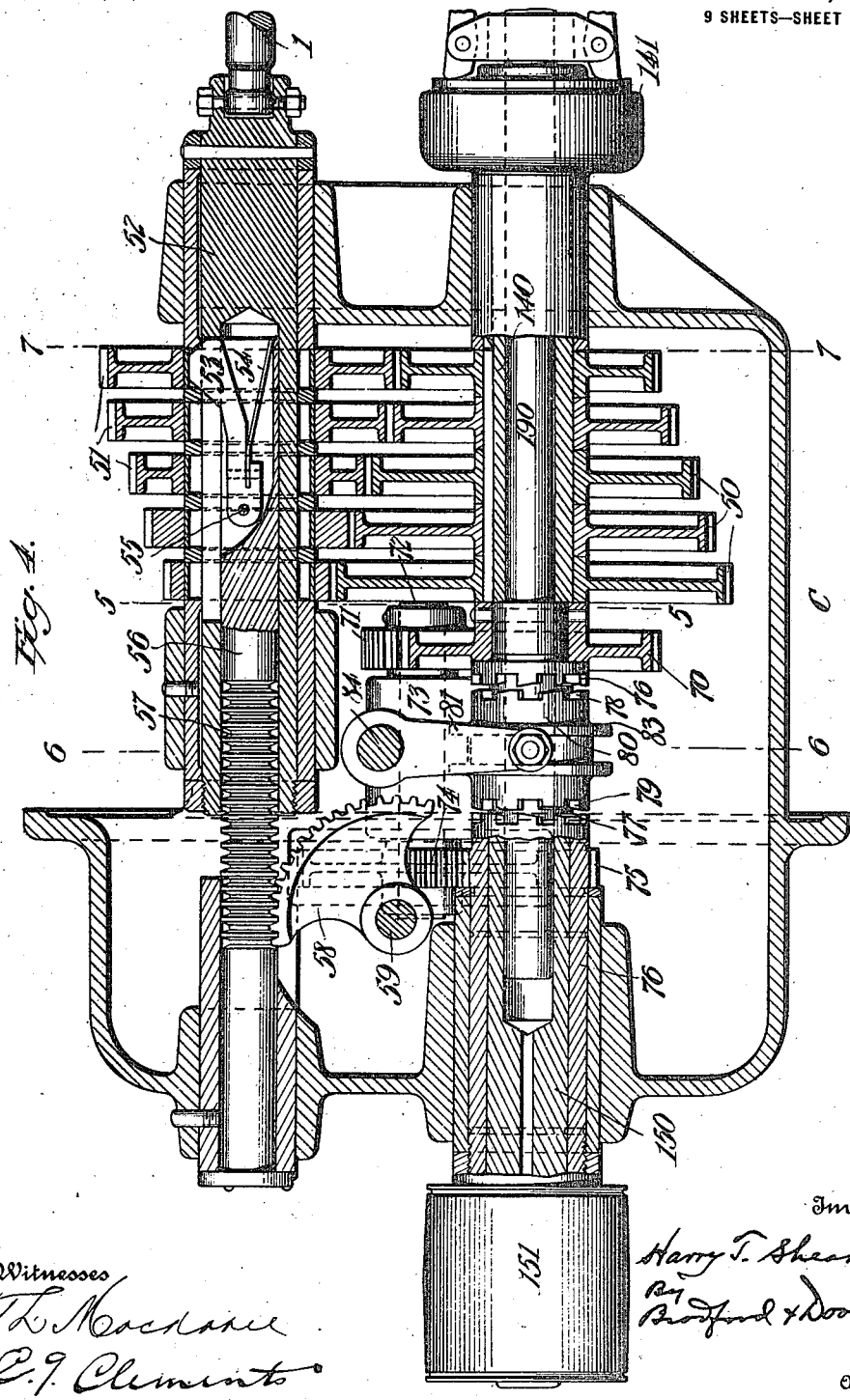

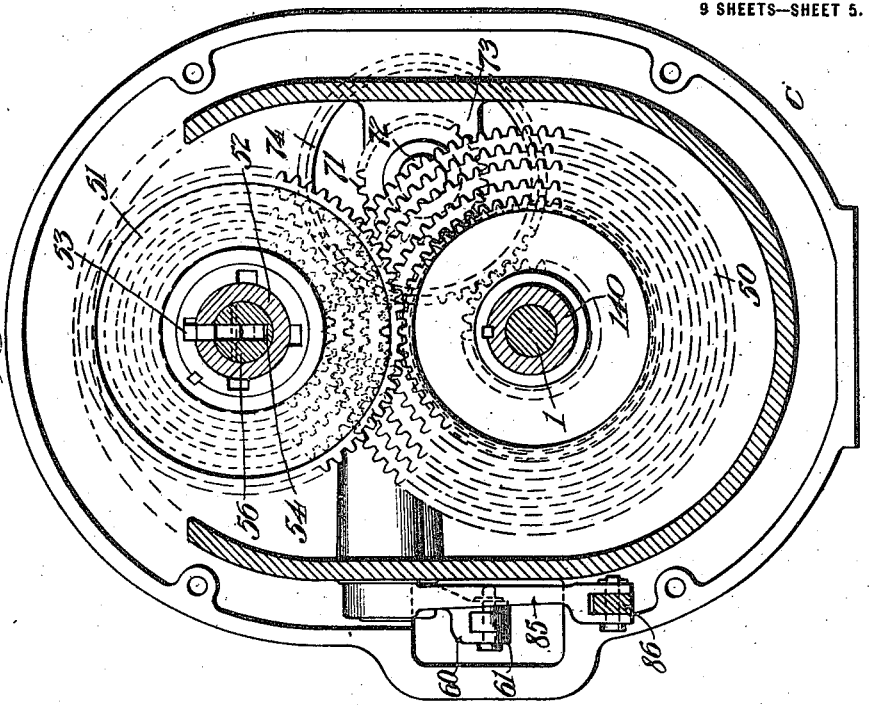
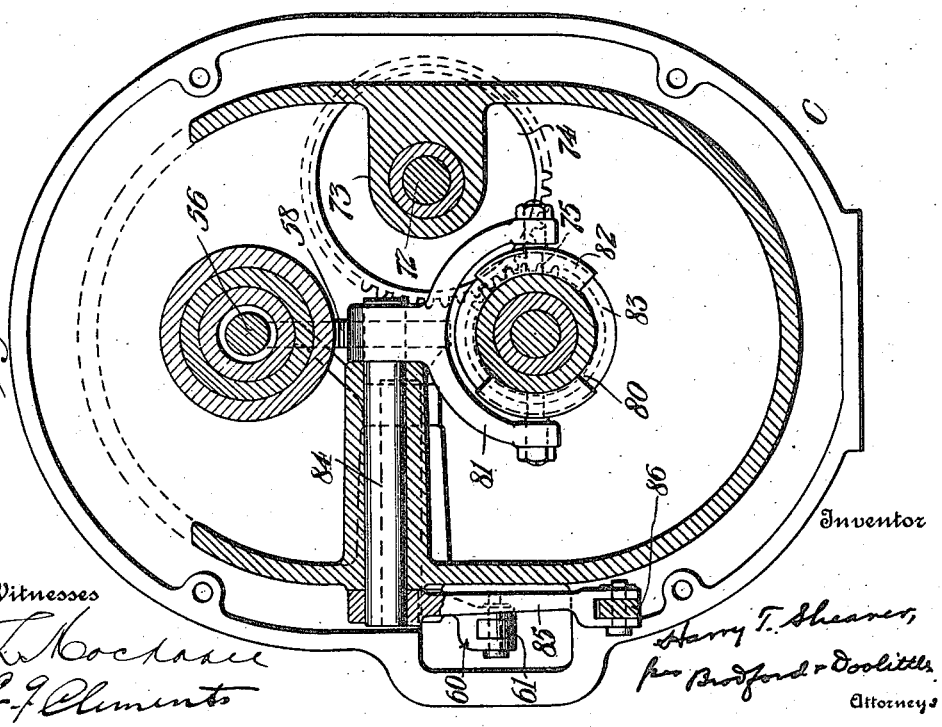

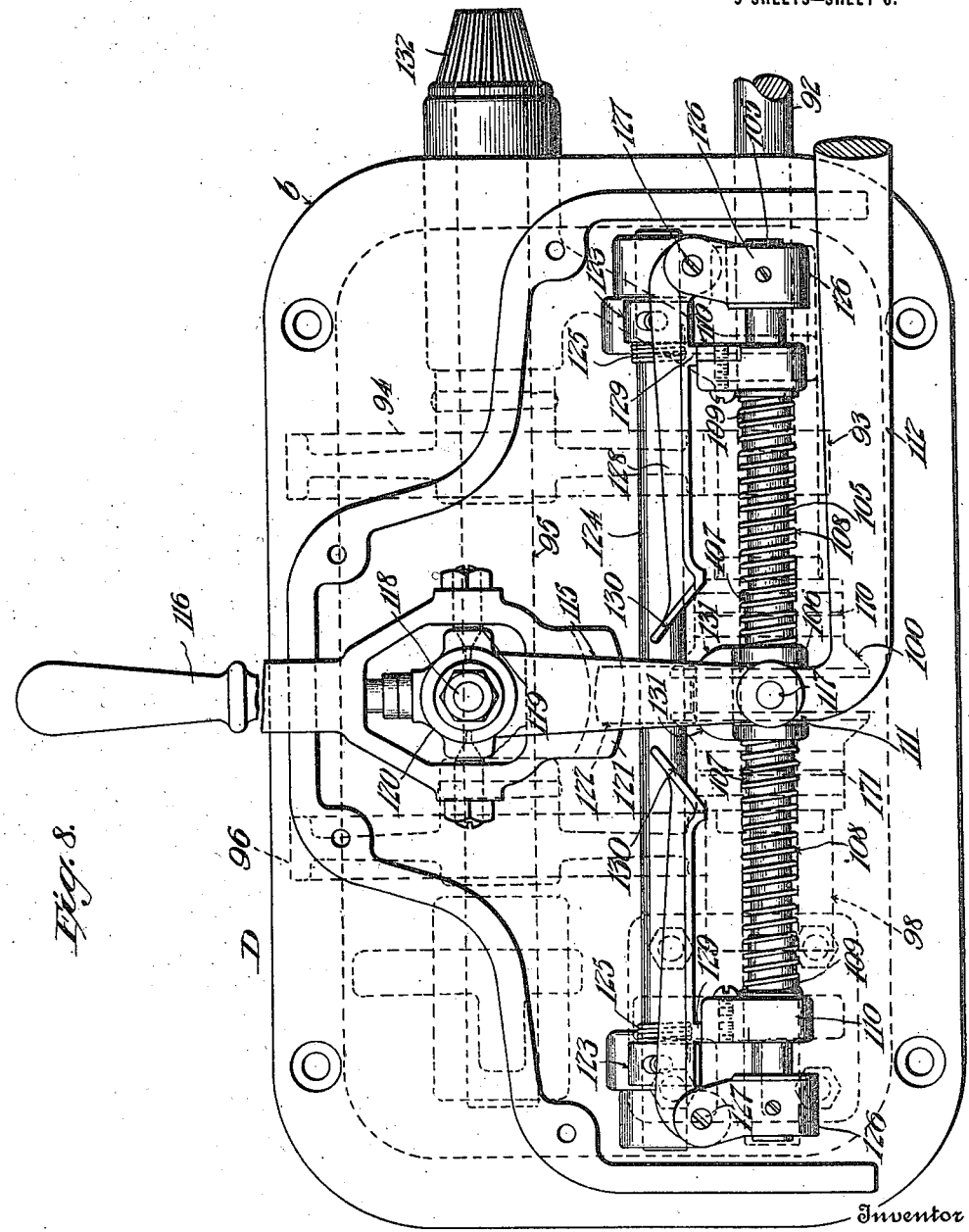

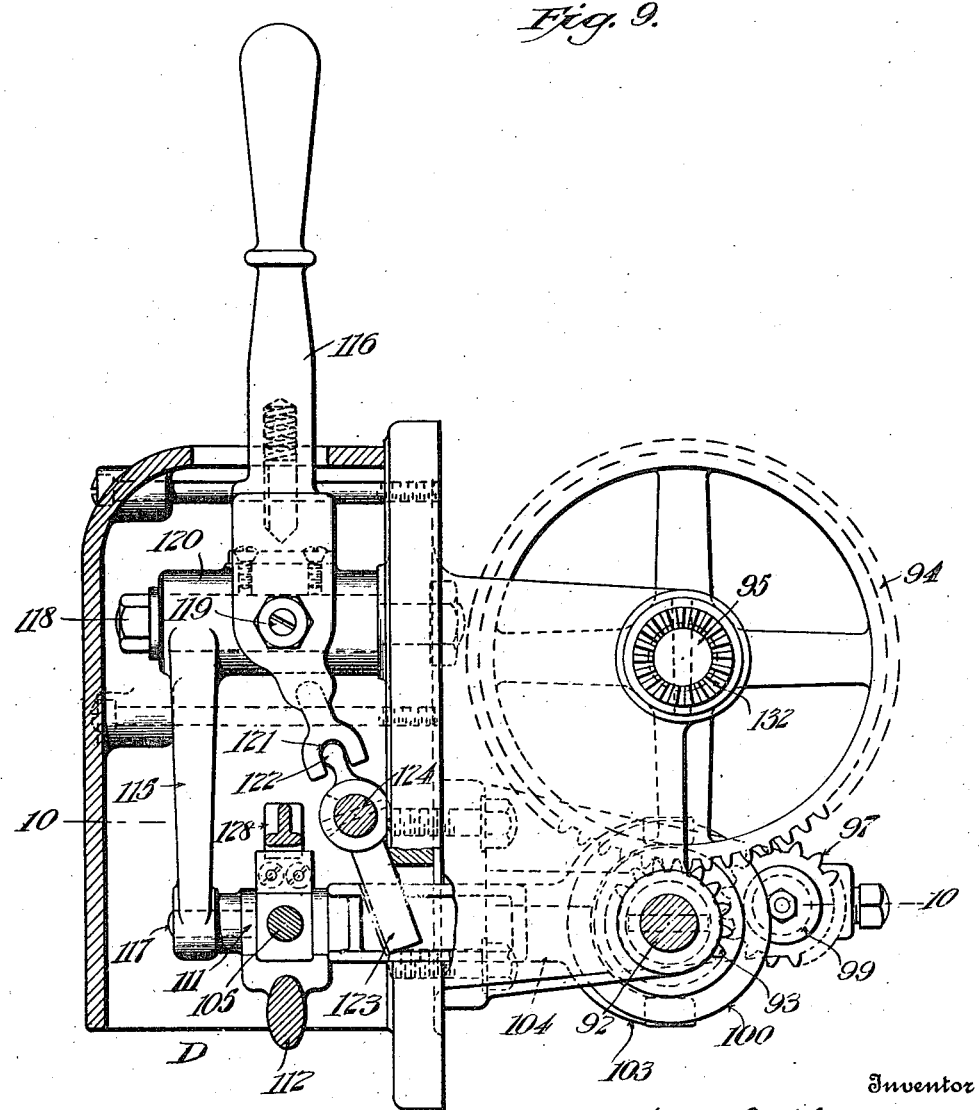

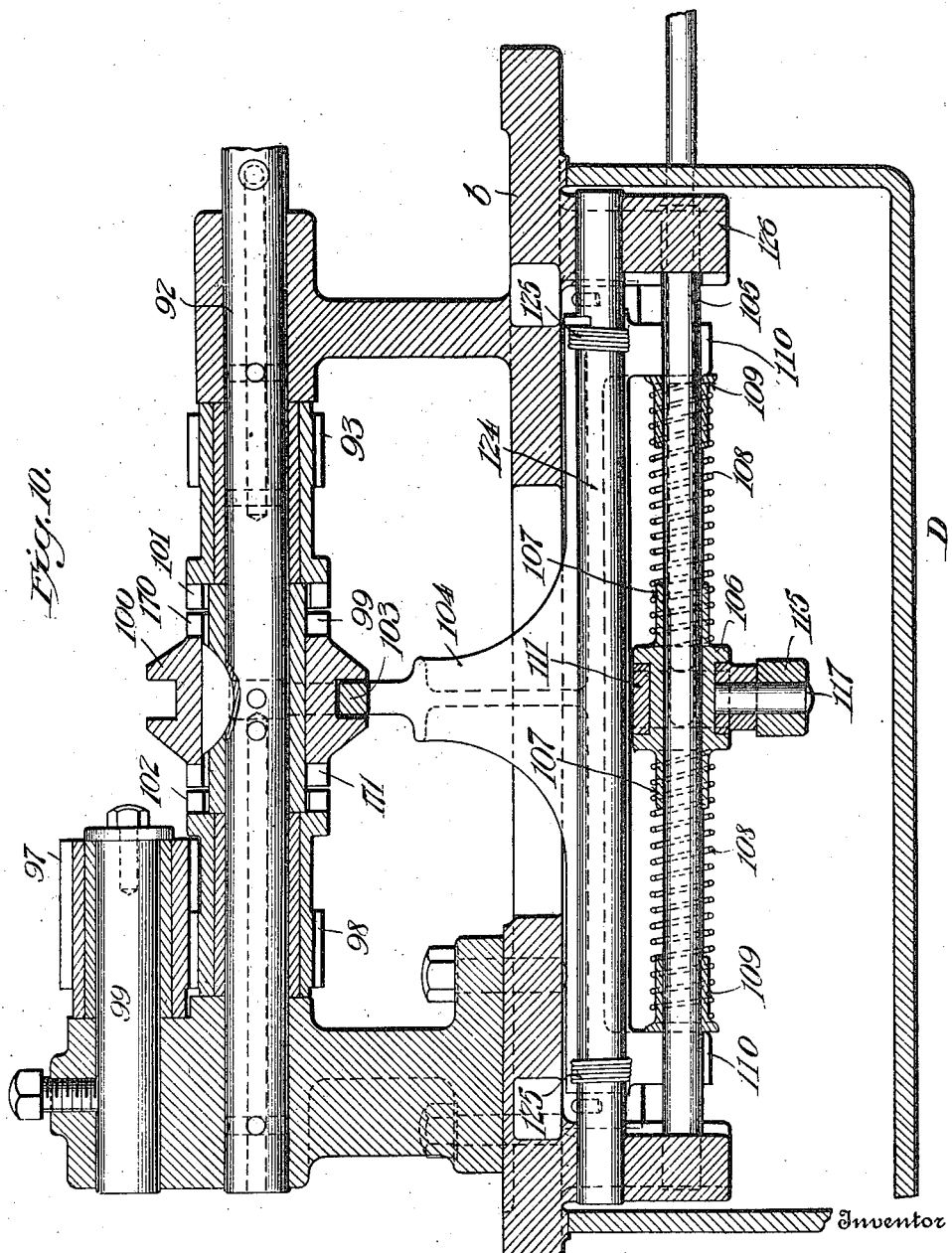

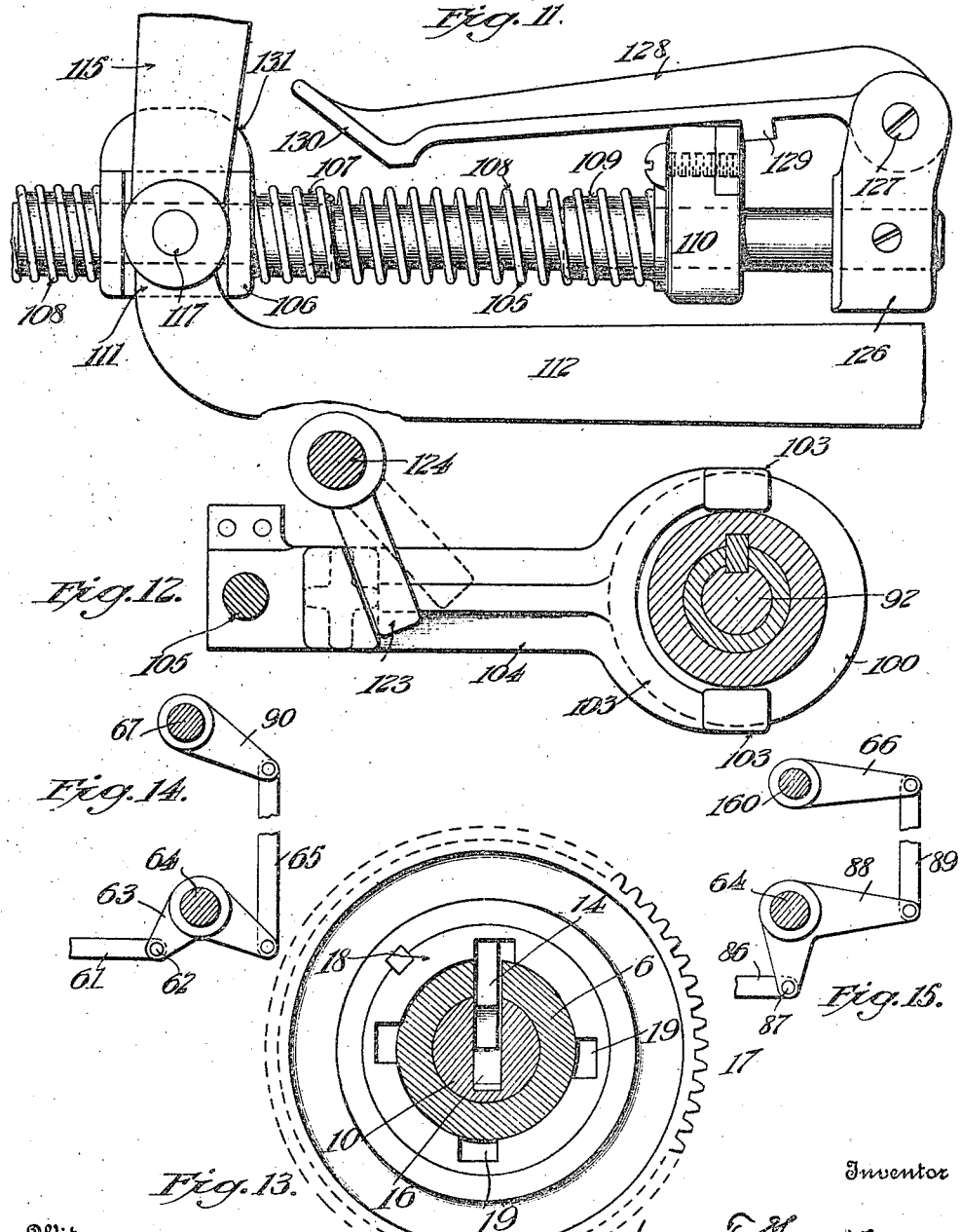

UNITED STATES PATENT OFFICE.

HARRY T. SHEARER, OF WAYNESBORO, PENNSYLVANIA, ASSIGNOR TO LANDIS TOOL COMPANY, OF WAYNESBORO, PENNSYLVANIA, A CORPORATION.

GRINDING-MACHINE.

1,165,365.  Specification of Letters Patent.  Patented Dec. 21, 1915.

Application filed March 13, 1913. Serial No. 753,898.

*To all whom it may concern:*

Be it known that I, HARRY T. SHEARER, a citizen of the United States, residing at Waynesboro, Franklin county, and State of Pennsylvania, have invented and discovered certain new and useful Improvements in Grinding-Machines, of which the following is a specification.

This invention relates to grinding machines.

The principal object of the invention is to provide a machine of this character embodying improved mechanism whereby said machine will be under the control of the operator at all times in order that the travel of the grinding wheel along the work may be instantly stopped, started or reversed, as desired.

Another object of the invention is to provide means for controlling the speeds at which the carriage may travel and at which the work may be driven.

Other objects and advantages of the invention will be apparent from the following description taken in connection with the accompanying drawings in which:—

Figure 1 represents a front elevation of a grinding machine with my improvements applied thereto, Fig. 2 is a longitudinal sectional view of the transverse speed change, Fig. 3 a cross-sectional view of the same on the line 3—3 of Fig. 2, also showing a section through the hand wheel of the mechanism, Fig. 4 a longitudinal sectional view of the work speed change, Fig. 5 a transverse section of the same in the line 5—5 of Fig. 4, Fig. 6 a transverse section on the line 6—6 of Fig. 4. Fig. 7 a similar view on the line 7—7 of Fig. 4, Fig. 8 a front elevation of the mechanism for stopping, starting and reversing the grinding wheel carriage, Fig. 9 a central transverse sectional view of the mechanism shown in Fig. 8, Fig. 10 is a horizontal sectional view in the line 10—10 of Fig. 9, Fig. 11 an enlarged view of a portion of the reversing mechanism, Fig. 12 an enlarged sectional view illustrating the operation of the locking finger employed in this mechanism, Fig. 13 a detailed elevation of one of the gear wheels of the work and traverse speed change, and Figs. 14 and 15 detail views of the bell-crank lever and their connecting links.

Referring to the drawings in detail, the grinding machine comprises a casing A, in which is mounted a mechanism for controlling the speed of travel of the grinding wheel carriage, such mechanism being termed the traverse mechanism and referred to by the letter B.

The mechanism for controlling the speed at which the work may be driven is designated by the letter C; and the mechanism which is used for starting, stopping and reversing the direction of travel of the carriage is designated by D.

The grinding wheel is designated by G and is mounted upon a carriage in the usual manner for travel longitudinally of the machine.

Power is applied to the machine in the usual or any well known manner, so as to drive the shaft 1, which extends practically throughout the length of the machine and has mounted thereon a pinion 2. This pinion through the medium of an idler 3 drives a gear 4, said gear being secured upon a shaft 6 by a pin $p$. One end of the said shaft 6 is hollow, and the opposite end is mounted in a bearing 7 formed upon the portion $a$ secured to the machine casing. Interposed between the shaft 6 and the bearing 7 is a bushing 8 which is secured to said shaft by a pin 9. Mounted within the hollow end of the shaft 6 is one end of a shaft 10, the opposite end of which is surrounded by a sleeve 11 and mounted within a bearing 12, said bearing being formed upon the portion $a$ of the machine casing A. The end of the shaft 10 lying within the shaft 6 is cut away as at 13, and pivoted within said cut away portion is a latch 14 mounted on a pin 15. The free end of this latch is forced outwardly by a spring 16 and works within a longitudinal slot formed in the shaft 6. Upon the shaft 6 is loosely mounted a series of gears 17 of different diameters, said gears having keyed within their hubs bushings 18 which bushings are provided with a plurality of notches 19 for engagement with the free end of the latch 14. As before stated the gears 17 are mounted upon the shaft 6, the sleeve 5 serving to hold said gears upon said shaft, and rings $r$ between them to space them apart. It is thus apparent that the gear 4 being driven from the pinion 2 will rotate the shaft 6 but will only move such of the gears 17 as may be locked therein by the latch 14.

The shaft 10 is adapted to be shifted longitudinally so as to permit the latch 14 to be brought into engagement with any one of the gears 17; this shifting movement being accomplished through the medium of a toothed segment 199 mounted on the shaft 20. A rod 21 is pivoted to the segment at 22, said rod being in turn pivoted at 23 on an arm 24 mounted upon the shaft of the hand wheel 25. This enables the operator to shift the shaft 10 so the latch 14 will be engaged with any one of the gears 17. A counter shaft 26 is mounted in appropriate bearings on the frame parallel with and adjacent the shaft 6.

Mounted upon the shaft 26 is a series of gears 27, these gears being also of different diameters and being so arranged as to engage the gears 17 and rotate therewith. The gears 27 are all keyed to the shaft 26 so that shaft will be driven at the speed to be determined by whichever of the gears 17 is engaged by the latch 14. Keyed also upon the shaft 26 is a gear 28, this gear being engaged by a gear 29 upon a short shaft 30. The gear 28 is formed with a clutch face 31 which is engaged by a similar face 32 upon the sliding clutch part 33 mounted upon the shaft 26. The opposite end of the clutch part 33 is formed with a clutch face 34 adapted to engage the clutch face 35 formed on the sleeve 36, said sleeve carrying a pinion 37 for engagement with a gear 237 on the shaft 30. A sliding frame 38 provided with a bifurcated end 39 engages a circumferential groove on the clutch part 33, and moves said clutch part through the medium of a segment 40 mounted upon a shaft 41, the teeth of said segment engage teeth 42 formed upon the sliding frame 38. This clutch is controlled by a hand lever 180 mounted upon the outer end of the shaft 41.

The mechanism for controlling the speed at which the work is to be driven and referred to as the work speed change, is mounted in the opposite end of the machine as at C, Fig. 4. This mechanism comprises a series of gears 50 keyed upon a hollow shaft 140 mounted upon the shaft 190, the said shaft being locked to the shaft 140 by means of a friction clutch 141 controlled by a lever 142 mounted upon the outside of the machine casing. This clutch permits the starting and stopping of the shaft 190 which controls the work. The gears 50 engage a series of gears 51 mounted upon hollow shaft 52 in a manner similar to the gears 17 of the traverse speed change, and are adapted to be engaged by a latch 53 controlled by a spring 54 in a cut out portion of the shaft 56. Said shaft 56 is mounted within shaft 53 and has circular rack teeth which are engaged by a segment 58. This mechanism is practically a duplicate of the mechanism just described in the traverse speed change in construction and operation.

The segment 58 is mounted upon the shaft 59, said shaft having mounted thereon an arm 60 as shown in Fig. 1. This arm 60 is pivoted to a rod 61 on the outside of the machine casing, and extends within said casing and is pivoted at 62 to one arm of a bell-crank lever 63 mounted on a shaft 64. The other arm of this bell-crank lever 63 is pivoted to a rod 65 which is in turn pivoted to an arm 90 mounted on a shaft 67 in a plate *a* secured to the machine casing A, said shaft 67 also carrying a hand wheel 91. The shaft 190 has secured thereto a gear 70, said gear through an idler 143 driving a pinion 71 upon a shaft 72 mounted in suitable bearings 73. A gear 74 mounted upon the opposite end of the shaft 72 engages a pinion 75 secured to or formed upon a sleeve 76 mounted upon a hollow spindle 150 which forms a bearing for one end of the shaft 190.

The gear 70 and the pinion 75 are each formed with a clutch face 76 and 77 respectively, said clutch faces being adapted for engagement with clutch faces 78 and 79 formed on the sliding clutch part 80. This clutch part is engaged by a yoke 81 carrying segmental shoes 82 which work within the groove 83 formed therein. The yoke 81 is mounted upon the short shaft 84 which shaft is provided with an arm 85. A link 86 is pivoted to the arm 85, the opposite end of said link being pivoted at 87 to one arm of the bell-crank 88 mounted upon the shaft 64 within the plate *a* of the machine casing. The opposite arm of the bell-crank 88 has pivoted thereto a rod 89 operated by an arm 66 mounted upon the shaft 160, an operating hand lever 181 being mounted upon said shaft on the outside of the machine.

It is readily seen from the foregoing description that a movement of either of the hand wheels 25 or 91 will, through the links 61 and 68, respectively, rock the segments 19 or 58 and slide the shafts 10 or 56, to cause any of the gears 17 or 51 to be locked to their respective shafts. This action will give different speeds to the shafts 92 or 190 of the traverse speed and work speed change, respectively, the shaft 92 being in line with the shaft 26 of the traverse speed change. An entirely different set of speeds may be had however with either of the above mechanisms by throwing the clutch part 33 or 80 into engagement with either of the pinions 37 or 75. When the clutch 33 is thus operated motion is then transmitted through the gear 28 to pinion 29 to shaft 30 and from the gear on said shaft to pinion 37 which drives shaft 92. When the clutch 80 engages the clutch face of the pinion 75 motion comes through the gear 70, pinion 71 gear 74 to pinion 75 which drives the shaft 150 upon which is mounted the pulley 151 by which the work is driven.

The head stock for the work is shown at A in Fig. 1, said stock being driven by suitable pulleys and belts shown in said figure.

The mechanism shown in Figs. 8 to 12 is provided for the purpose of controlling the movement of the grinding wheel carriage and as shown at D in Fig. 1 in dotted lines, and illustrated in detail in figures just mentioned. The shaft 92 is driven in any preferred manner by a portion of the machine gearing, and has mounted thereon a pinion 93 which engages a gear 94 mounted upon the shaft 95. Another gear 96 similar to the gear 94 is mounted upon the shaft 95 and is engaged by a pinion 97 upon the shaft 99, which pinion in turn engages the pinion 98 on the shaft 92. Interposed between the pinions 93 and 98 upon the shaft 92 is a sliding clutch part 100 having clutch-faces 170 and 171 engaging clutch-faces 101 and 102 formed upon the hubs of the pinions 93 and 98 respectively. The clutch part 100 is engaged by a bifurcated end 103 of a yoke 104 slidable upon the shaft 105 suitably mounted in lugs 126 upon the plate *b* of the machine casing. This shaft 105 is provided with a sleeve 106, the reduced ends 107 of which, are embraced by springs 108, said springs also encircling sleeves 109 bearing against extensions 110 formed upon the yoke 104. The sleeve 106 is formed with a groove, said groove being engaged by the bifurcated end 111 of the rod 112, this rod being in turn pivoted to an arm 113 on the shaft 114. The lower end 115 of the hand lever 116 is pivoted to the bifurcated end 111 of the lever 112, said pivot being shown at 117. This lever 116 is pivotally mounted at 118 so as to have a movement longitudinally of the machine. The said lever 116 also has a movement at 90° thereto, and in order to accomplish this the upper portion of said lever is pivoted at 119 to a hub 120 which embraces the pivot 118. This lever is in fact composed of two pieces so as to provide for a longitudinal and lateral movement. The lower portion of the lever 116 is provided with a forked end 121 which end engages a lever 122 secured upon the shaft 124. Fingers 123 are also mounted upon the shaft 124. These fingers are held normally in elevated position as shown in dotted lines in Fig. 12 by means of springs 125 and are only depressed through the action of the outward movement of the lever 116 which forms a toggle joint at 122 for the operation of said fingers. The lugs 126, which form bearings for the shaft 105, are located adjacent to lugs 110 on the yoke 104 and the fingers 123 are adapted to be interposed between said lugs so as to lock the mechanism. Pivoted upon the lugs 126 at 127, are latches 128, said latches being provided with lugs 129 and hold them against the action of the springs 108. The free end of the latches 128 are formed with inclined faces 130 which are adapted for engagement with the inclined faces 131 formed upon the sleeve 106. It is apparent from Fig. 11 that a movement of the sleeve 106 in the direction of the latch 128 will cause the inclined face 130 to ride upon the face 131 and lift the lug 129 from engagement with the lug 110. The shaft 95 carries a beveled pinion 132 for engagement with a beveled gear, not shown, for operating the grinding wheel carriage.

When the sliding clutch part 98 is in the position shown in Fig. 10, the mechanism is inactive, but in order to drive the carriage the clutch part is moved to engage with either of the clutch-faces 101 or 102, according to the direction in which it is desired the carriage to move. This may be done normally by means of the lever 116 or accomplished automatically by the automatic engagement and disengagement of the lugs 129 with the lugs 110. In order to stop the carriage it is only necessary to draw the lever 116 outward which through the action of a toggle joint at 122 drops either of the lugs 123 into position between the lugs 110 and 126 at either end of the mechanism according to the position of the parts when the lever 116 is operated. If the lever 116 is drawn outward with the carriage on its travel, the said carriage will continue to move until it reaches the reversing point, when the sliding clutch is thrown over to the reverse, the finger 123 having been dropped already into the space between the lugs 110 and 126 which interferes with the movement and stops the mechanism in time to prevent the inclined face 131 from acting upon the incline 130 of the latch 128.

Having thus fully described my said invention, what I claim as new and desire to secure by Letters Patent, is:

1. A grinding machine comprising a casing, a grinding wheel mounted upon a carriage movable upon said casing, mechanism contained within said casing for determining the speed at which said grinding wheel will travel along the work, a head stock mounted upon said casing, mechanism contained within said casing for controlling the speed at which the work may be driven, and means carried by said machine for starting stopping and reversing the direction of travel of the grinding wheel carriage, substantially as set forth.

2. A grinding machine comprising a casing, a grinding wheel mounted upon a carriage movable upon said casing, a plurality of intermeshing gears of different diameters mounted upon shafts within said casing, a spring latch located within one of said shafts for locking any selected gear thereto, means for positioning said latch so as to engage said selected gear, means for controlling the speed at which the work may be driven, and means carried by said machine for starting stopping and reversing the direction of travel of the grinding wheel carriage.

3. A grinding machine comprising a casing, a grinding wheel mounted upon a carriage movable upon said casing, a plurality of intermeshing gears of different diameters mounted upon shafts within said casing, a spring latch located within one of said shafts and adapted to engage one of said gears, circular teeth formed upon said shaft, a toothed segment engaging its teeth, means for operating said segment, means for controlling the speed at which the work may be driven and means for starting, stopping and reversing the direction of travel of the grinding wheel carriage, substantially as set forth.

4. A grinding machine comprising a casing, a grinding wheel mounted upon a carriage movable upon said casing, a plurality of intermeshing gears of different diameters mounted upon shafts within said casing, means carried by one of said shafts for locking any one of its gears thereon, a gear provided with a clutch face, said gear being fast upon its shaft and engaging a pinion on a short shaft, a gear mounted upon said short shaft and engaging a pinion having a clutch face mounted in line with the clutch faced gear before mentioned, a double faced clutch interposed between said clutch faced gear and pinion, a yoke engaging said clutch the arm of said yoke being provided with a rack, a toothed segment engaging said rack, a lever for operating said segment, means for controlling the speed at which the work may be driven and means for starting, stopping and reversing the direction of travel of the grinding wheel carriage, substantially as set forth.

5. A grinding machine comprising a casing, a grinding wheel mounted upon a carriage movable upon said casing, means for controlling the speed of travel of said carriage, intermeshing gears of different diameters for regulating the speed at which the work may be driven, one set of said gears being fast to a sleeve on a shaft, a clutch for locking said sleeve and shaft together, a second clutch whereby a different set of speeds is obtained, and means for starting, stopping and reversing the direction of travel of the grinding wheel carriage, substantially as set forth.

6. A grinding machine comprising a grinding wheel mounted upon a carriage, means for regulating the speed of travel of said carriage, means for regulating the speed at which the work may be driven, a starting, stopping and reversing lever carried by said machine, a yoke actuated by said lever, and a clutch controlled by said yoke, whereby the starting, stopping and reversing of the said carriage is accomplished.

7. A grinding machine comprising a grinding wheel mounted upon a carriage, means for regulating the speed of travel of said carriage, means for regulating the speed at which the work may be driven, a lever carried by said machine, a yoke actuated by said lever, a clutch controlled by said yoke, and means for automatically shifting said yoke, substantially as set forth.

8. A grinding machine comprising a grinding wheel mounted upon a carriage, means for regulating the speed of travel of said carriage, means for regulating the speed at which the work may be driven, a clutch for controlling the operation of said carriage, and means for both automatically and manually controlling said clutch.

9. A grinding machine comprising a grinding wheel mounted upon a carriage, means for regulating the speed of travel of said carriage, means for regulating the speed at which the work may be driven, a clutch for controlling the movement of said carriage, a yoke connected to said clutch, lugs formed upon said yoke, a shaft located adjacent to said lugs, a cam mounted upon said shaft and pivoted dogs adapted to engage said lugs, said dogs having beveled portions for engagement with said cam.

10. A grinding machine comprising a grinding wheel mounted upon a carriage, means for regulating the speed of travel of said carriage, means for regulating the speed at which the work may be driven, a clutch, a sliding yoke connected to said clutch, lugs carried by said yoke, pivoted dogs mounted for engagement with said lugs, a cam adapted to engage the free end of said lugs, springs interposed between said lugs and cam, a universal lever connected to said cam and pivoted fingers controlled by said lever, substantially as set forth.

11. A grinding machine comprising a casing, work carrying and driving mechanism, a grinding wheel carriage mounted to traverse on said casing, a main driving shaft, a second shaft geared thereto, a series of gears of varying diameters mounted loosely on said shaft, a latch slidably mounted in said shaft for locking a selected gear thereto, means for sliding said latch, another shaft parallel with said second shaft and having corresponding gears keyed thereto and meshing with the loosely mounted gears on said second shaft, gear connection between said shaft and the gear for traversing the grinding wheel carriage, and means for throwing said gear into and out of operation, substantially as set forth.

12. A grinding machine comprising a casing, work holding and driving means, a grinding wheel carriage mounted to traverse on said casing, a main driving shaft, gear connecting said driving shaft with said grinding wheel traverse mechanism embodying a series of intermeshing gears of varying diameters on parallel shafts the gears on one shaft being normally loose, means for locking a selected loose gear at will, another set of gears connecting said main driving shaft with the work driving means also embodying a set of gears of varying diameters on parallel shafts, those on one shaft being normally loose, means for locking a selected one of said loose gears to its shaft, and means for both automatically and manually throwing said gears into and out of operation, substantially as set forth.

In witness whereof, I have hereunto set my hand and seal at Washington, District of Columbia, this eighth day of January, A. D. nineteen hundred and thirteen.

HARRY T. SHEARER. [L. S.]

Witnesses:
 E. W. BRADFORD,
 E. G. CLEMENTS.